(12) United States Patent
Nagai et al.

(10) Patent No.: US 6,327,924 B2
(45) Date of Patent: Dec. 11, 2001

(54) ACTUATOR FOR CONVERTING ROTARY MOTION INTO RECTILINEAR MOTION

(75) Inventors: Shigekazu Nagai, Tokyo; Masaki Miyahara, Ibaraki-ken, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/170,324

(22) Filed: Oct. 13, 1998

(30) Foreign Application Priority Data

Oct. 20, 1997 (JP) .................................... 9-287290

(51) Int. Cl.[7] .................................................. E16H 25/20
(52) U.S. Cl. .......................................... 74/89.36; 74/89.33
(58) Field of Search ........................... 74/89.15, 424.8 R, 74/459, 89.33, 89.36

(56) References Cited

U.S. PATENT DOCUMENTS

| | | | |
|---|---|---|---|
| 3,945,481 | * 3/1976 | Lindberg | 74/424.8 R |
| 4,232,562 | 11/1980 | Perkins . | |
| 4,276,003 | * 6/1981 | Perkins et al. | 74/89.15 |
| 5,170,675 | 12/1992 | Kawashima . | |

FOREIGN PATENT DOCUMENTS

| | | |
|---|---|---|
| 60196461 | 4/1985 | (JP) . |
| 03277820 | 9/1991 | (JP) . |
| 4-140546-A | * 5/1992 | (JP) . |
| 7-315773 | * 12/1995 | (JP) . |
| 8-42657 | * 2/1996 | (JP) . |

\* cited by examiner

*Primary Examiner*—Vinh T. Luong
*Assistant Examiner*—William C Joyce
(74) *Attorney, Agent, or Firm*—Oblon, Spivak, McClelland, Maier & Neustadt, P.C.

(57) ABSTRACT

Rotary motion of a ball screw is converted by a feed nut into rectilinear motion to allow a displacement mechanism to make rectilinear motion. When the ball screw involves axial deviation, then an engagement member slides in a direction of the arrow C with respect to a nut holder by the aid of a first guide mechanism, and a second sliding guide slides in a direction of the arrow B with respect to the engagement member by the aid of a second guide mechanism. Accordingly, even when the ball screw involves axial deviation with respect to the second sliding guide, the sliding resistance is not increased between the second sliding guide and a frame of an actuator. Therefore, even when there is any axial deviation between the ball screw and the frame, there is no fear of obstructing the displacement action of a displacement member.

9 Claims, 8 Drawing Sheets

ACTUATOR FOR CONVERTING ROTARY MOTION INTO RECTILINEAR MOTION

BACKGROUND OF THE INVENTION

1. Field of the Invention

The present invention relates to an actuator for converting rotary motion of a feed screw into rectilinear motion by using a feed nut to allow a displacement member to perform rectilinear motion.

2. Description of the Related Art

Figure 8:
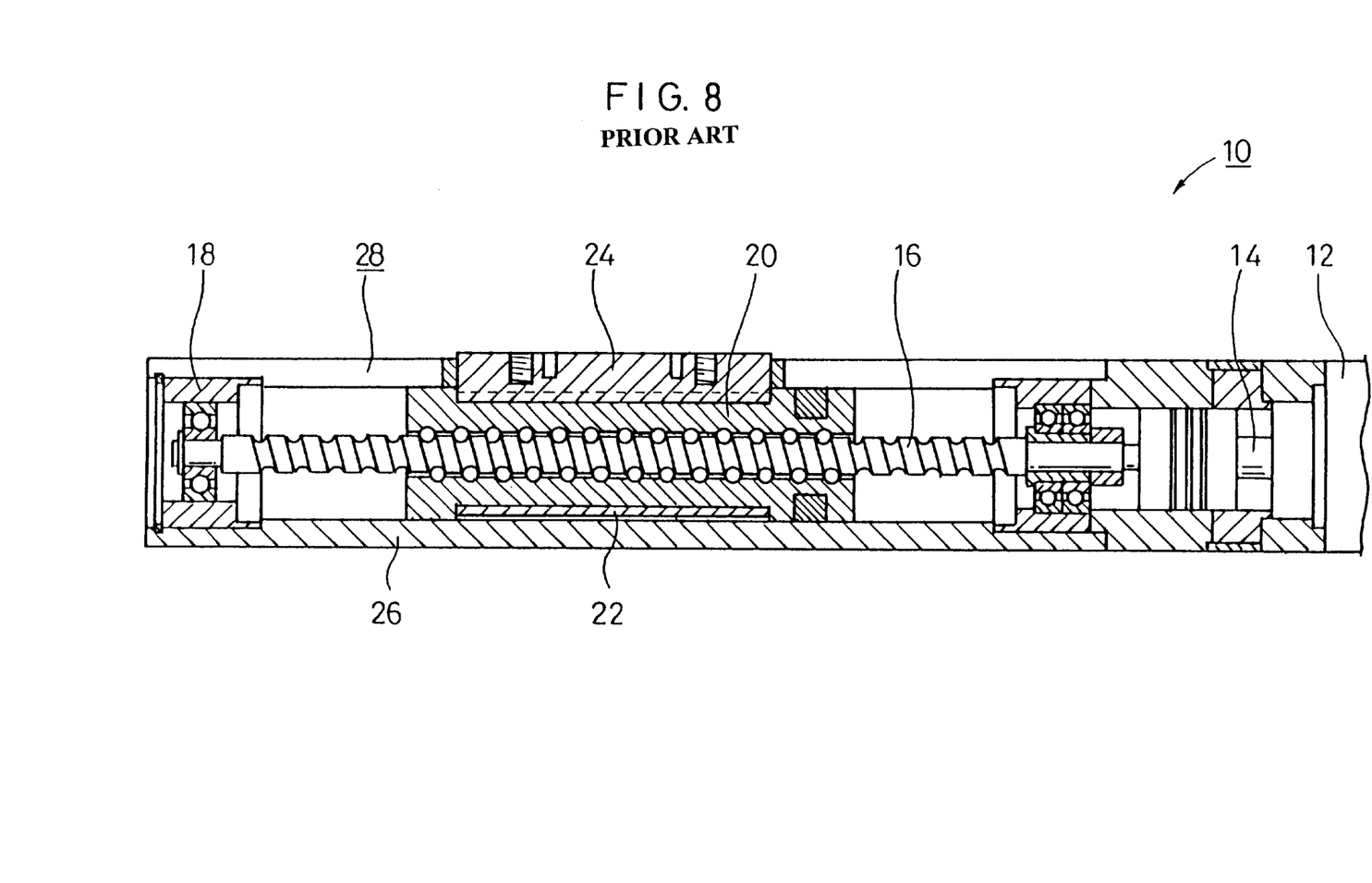
FIG. 8 shows a longitudinal sectional view illustrating an actuator concerning the conventional technique.

An actuator, which is based on the use of a feed screw, has been hitherto used as a driving source for transporting a workpiece or the like. For example, as shown in FIG. 8, such an actuator 10 comprises a ball screw 16 with its one end which is connected to a rotary shaft 14 of a motor 12. The other end of the ball screw 16 is rotatably supported by a shaft support member 18. A feed nut 20 meshes with the ball screw 16. The feed nut 20 is surrounded by a displacement member 22. The displacement member 22 is formed with an attachment section 24 which protrudes at an upper portion of the displacement member 22 and which extends along its displacement direction. The attachment section 24 protrudes upwardly through a slit 28 which is formed at an upper portion of a frame 26 of the actuator 10.

When the motor 12 is operated, the rotary motion of the ball screw 16 is converted into rectilinear motion by the aid of the feed nut 20. The rectilinear motion is transmitted to the displacement member 22. Thus, the displacement member 22 makes displacement along the longitudinal direction of the actuator 10.

However, if the conventional actuator 10 as described above involves any axial deviation between the frame 26 and the ball screw 16, then the sliding resistance with respect to the inner wall of the frame 26 is increased when the displacement member 22 makes displacement, and the displacement action of the displacement member 22 is obstructed when the displacement member 22 makes displacement in the frame 26.

For this reason, when the ball screw 16 is assembled to the frame 26, then it is necessary that the both ends of the ball screw 16 are subjected to centering adjustment with respect to the rotary shaft 14 and the shaft support member 18, and it is also necessary that the ball screw 16 is subjected to centering adjustment with respect to the feed nut 20. Therefore, a problem arises in that the assembling operation is complicated.

Further, if the central portion of the ball screw 16 is warped, for example, when the actuator 10 has a lengthy size, or when a load of a workpiece or the like is exerted on the displacement member 22, then the sliding resistance between the displacement member 22 and the frame 26 is increased in the same manner as described above, and the displacement member 22 occasionally fails to make displacement. For this reason, it has been impossible to allow the actuator 10 to have a fairly long size, and it has been also necessary to restrict the load of the workpiece.

SUMMARY OF THE INVENTION

A general object of the present invention is to provide an actuator which is free from any fear of obstructing the displacement action of a displacement member even when the actuator involves axial deviation between a feed screw and a frame.

A principal object of the present invention is to provide an actuator which prevents the displacement action of a displacement member from being affected by positional deviation of a feed screw and warpage of the feed screw by absorbing axial eccentricity of the feed screw by using an axial eccentricity-absorbing mechanism which is displaceable in a direction perpendicular to a direction of displacement of the displacement member, making it possible to permit the positional deviation and the warpage of the feed screw.

Another object of the present invention is to provide an actuator comprising an axial eccentricity-absorbing mechanism which is composed of a first guide mechanism designed to be linearly displaceable in a direction perpendicular to a direction of displacement of a displacement member and a second guide mechanism designed to be linearly displaceable in a direction perpendicular to the direction of displacement of the displacement member but in the direction different from the direction of displacement of the first guide mechanism, thereby making it possible to absorb axial eccentricity of a feed screw by using the relatively simple mechanism.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The actuator according to the present invention will be described in detail below with reference to the accompanying drawings, referring to preferred embodiments.

Figure 1:
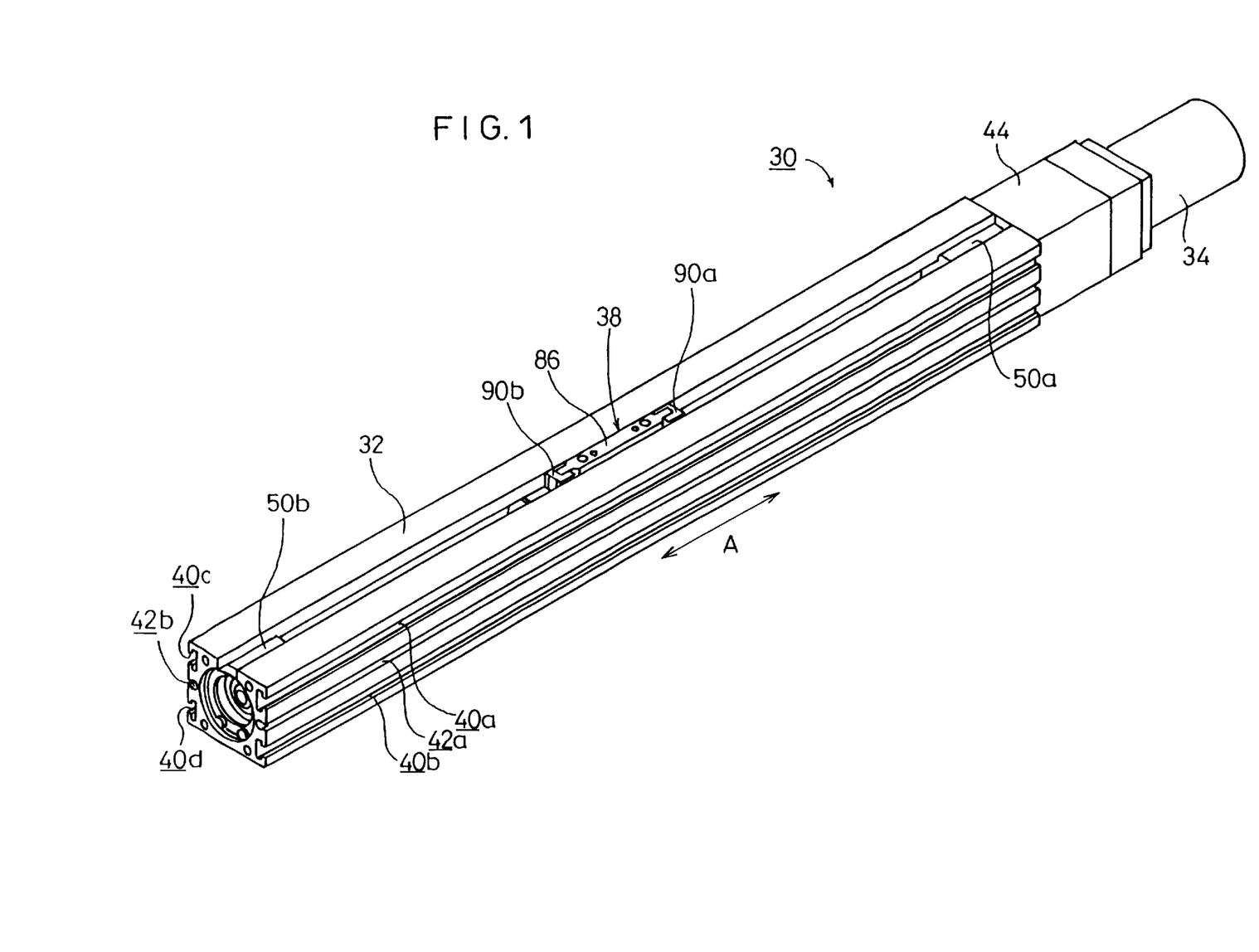
FIG. 1 shows a perspective view illustrating an actuator according to a first embodiment of the present invention.
Figure 2:
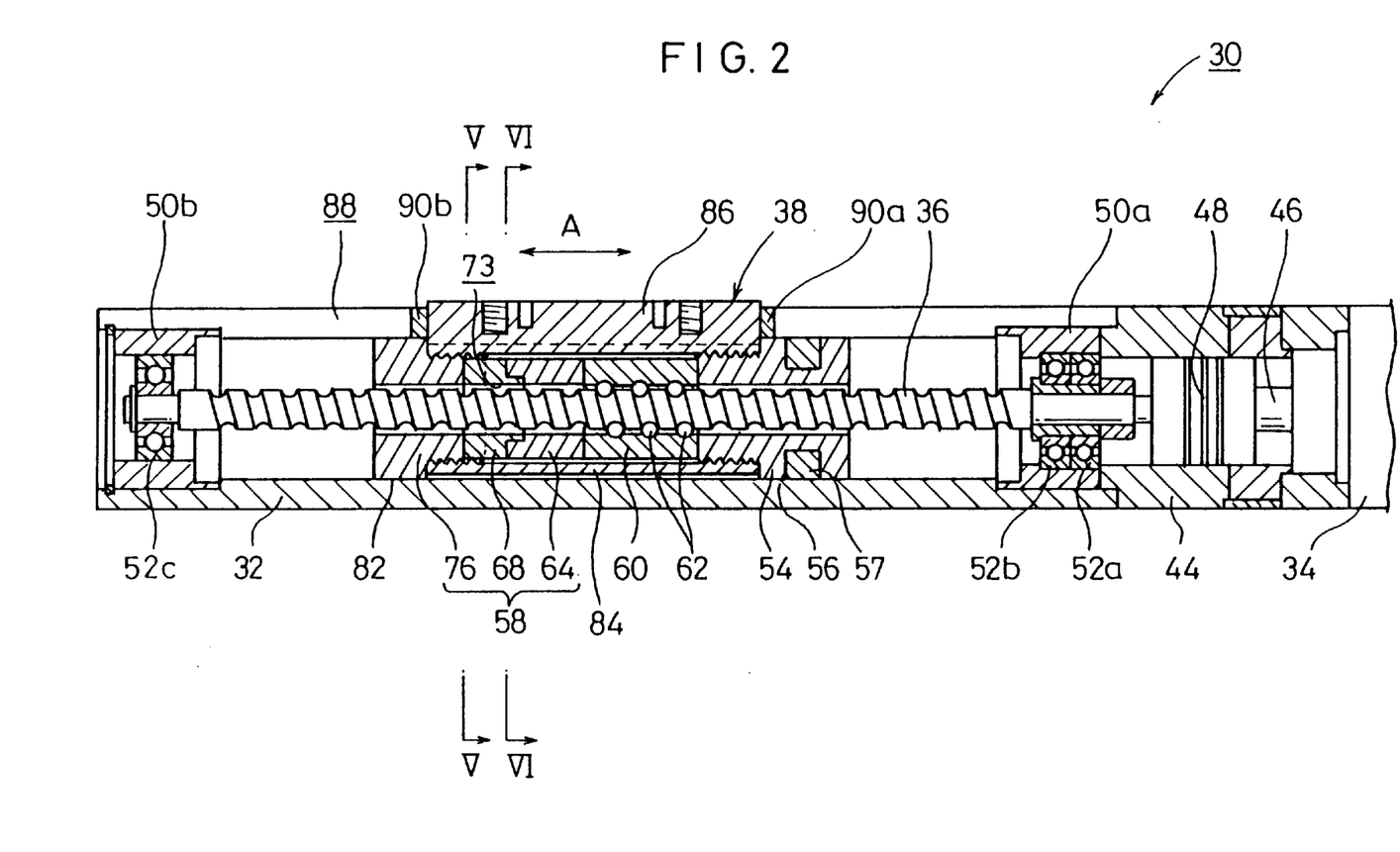
FIG. 2 shows a longitudinal sectional view illustrating the actuator shown in FIG. 1.

With reference to FIGS. 1 and 2, reference numeral 30 indicates an actuator according to a first embodiment of the present invention. The actuator 30 basically comprises a frame 32 formed to have a lengthy size, a motor 34 provided at one end of the frame 32, a ball screw 36 rotatably supported in the frame 32, and a displacement mechanism 38 for slidably contacting with the inner circumference of the frame 32 to make displacement by the aid of the ball screw 36.

A plurality of extending attachment grooves 40a to 40d, which are used to attach the actuator 30 to another member by the aid of unillustrated attachment means such as bolts, are formed along the longitudinal direction on side surfaces of the frame 32. Sensor grooves 42a, 42b, to which an unillustrated position sensor is attached, are formed between the extending attachment grooves 40a, 40b, 40c, 40d to extend along the longitudinal direction.

One end of a spacer 44 is secured to one end of the frame 32. The motor 34 is secured to the other end of the spacer 44. The ball screw 36 is connected via a coupling 48 to a rotary shaft 46 of the motor 34. Both ends of the ball screw 36 are rotatably supported via bearings 52a to 52c by shaft support members 50a, 50b installed inside at both ends of the frame 32.

Figure 3:
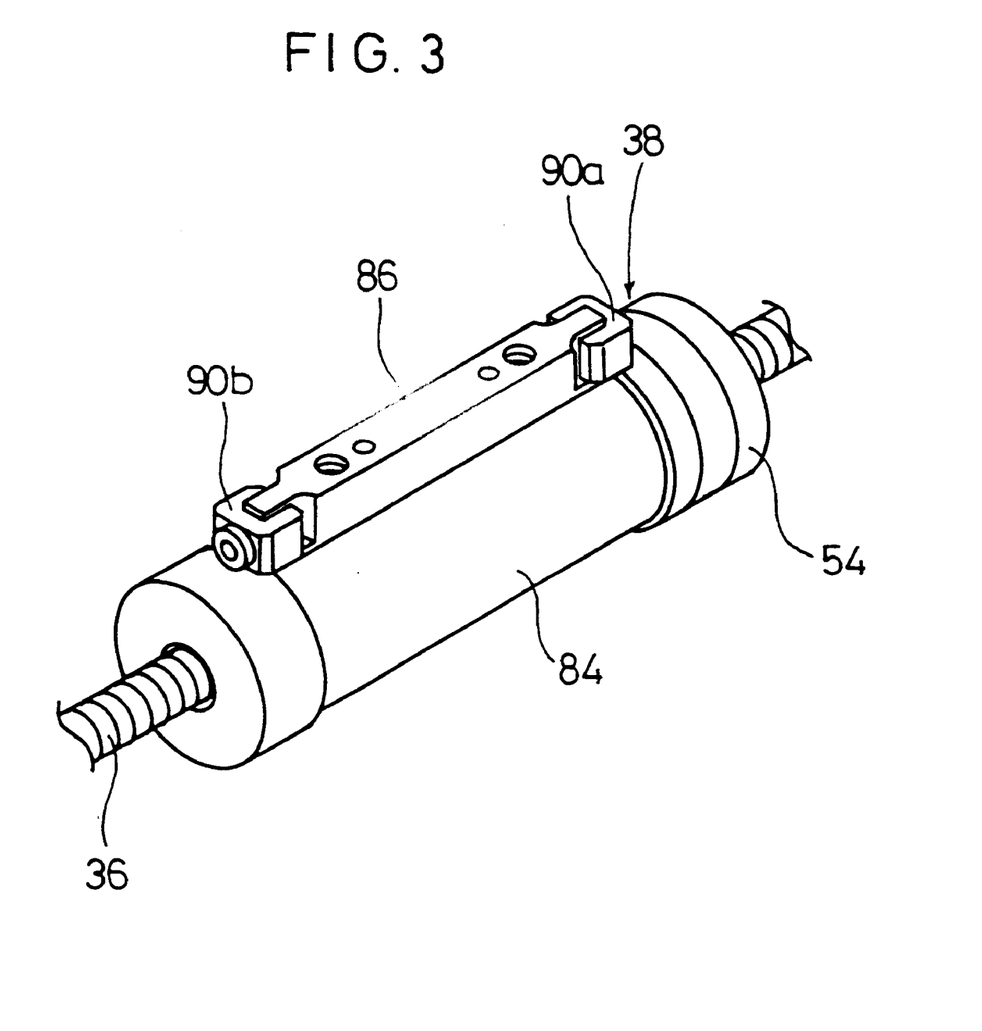
FIG. 3 shows a perspective view illustrating a displacement mechanism used for the actuator shown in FIG. 1.
Figure 4:
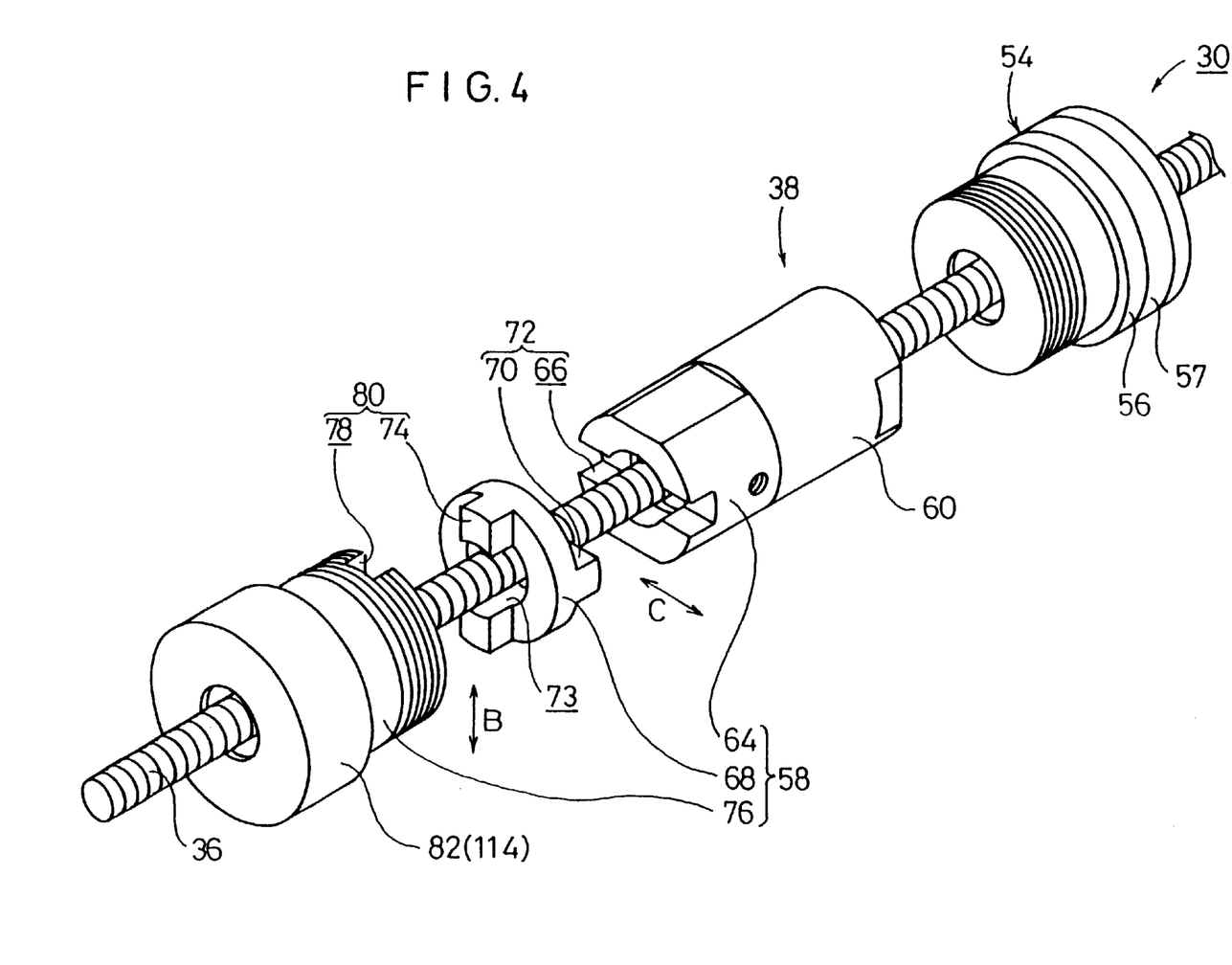
FIG. 4 shows an exploded perspective view illustrating the displacement mechanism shown in FIG. 3.

The ball screw 36 is inserted into the displacement mechanism 38 (see FIG. 3). As shown in FIG. 4, a first sliding guide 54 is provided at one end of the displacement mechanism 38. The first sliding guide 54 has its inner wall which is separated from the ball screw 36 by a predetermined spacing distance. A diametrally expanded section 56 is formed at one end of the first sliding guide 54. The diametrally expanded section 56 is slidable on the inner wall of the frame 32. A ring-shaped permanent magnet 57 is installed to the diametrally expanded section 56. In this embodiment, a sensor (not shown), which is installed at a predetermined position of the sensor groove 42a, 42b of the frame 32, detects the magnetic force of the permanent magnet 57 which is displaced together with the displacement mechanism 38. Thus, for example, the displacement amount of the displacement mechanism 38 can be detected.

A feed nut 60, which is formed to have a substantially cylindrical configuration, abuts against an end of the first sliding guide 54. The feed nut 60 is engaged with the ball screw 36 by the aid of ball members 62. One end of a nut holder 64, which constitutes an axial eccentricity-absorbing mechanism 58, is secured to one end of the feed nut 60. The nut holder 64 has its inner wall which is separated from the ball screw 36 by a predetermined spacing distance. As shown in FIG. 4, a first guide groove 66, which extends in a direction (direction indicated by the arrow C) perpendicular to the ball screw 36, is formed at the other end of the nut holder 64. An engagement member 68, which is formed to have a substantially ring-shaped configuration for constructing the axial eccentricity-absorbing mechanism 58, has a first guide section 70 which is slidably engaged with the first guide groove 66. A first guide mechanism 72 is constructed by the first guide groove 66 and the first guide section 70. An inner wall for forming a hole 73 of the engagement member 68 is separated from the ball screw 36 by a predetermined spacing distance.

A second guide section 74 is formed to protrude on a surface of the engagement member 68 opposite to the first guide section 70, the second guide section 74 extending in a direction (direction indicated by the arrow B) perpendicular to the axial direction of the ball screw 36 and the displacement direction of the first guide section 70 respectively. The axial eccentricity-absorbing mechanism 58 includes a second sliding guide 76. A second guide groove 78, which is formed on the second sliding guide 76, is slidably engaged with the second guide section 74. A second guide mechanism 80 is constructed by the second guide section 74 and the second guide groove 78. The second sliding guide 76 has its inner wall which is separated from the ball screw 36 by a predetermined spacing distance. A diametrally expanded section 82 is formed at one end of the second sliding guide 76. The diametrally expanded section 82 is slidable on the inner wall of the frame 32.

The first sliding guide 54 and the second sliding guide 76 are screwed into both ends of a substantially cylindrical displacement member 84. The feed nut 60, the nut holder 64, and the engagement member 68 are inserted into the displacement member 84. A projection 86, which extends along the longitudinal direction of the actuator 30, is formed to protrude at an upper portion of the displacement member 84. The projection 86 is inserted into a slit 88 defined at an upper portion of the frame 32. Guide members 90a, 90b, each of which is formed to have a substantially angular U-shaped configuration, are secured to both ends of the projection 86. The guide members 90a, 90b are slidable on walls which form the slit 88. An unillustrated table or the like can be installed to the projection 86.

The actuator 30 according to the first embodiment is basically constructed as described above. Next, its operation will be explained.

When the motor 34 is operated to rotate the rotary shaft 46, the ball screw 36 is rotated via the coupling 48. The rotary motion is transmitted via the ball members 62 to the feed nut 60. During this process, the displacement mechanism 38 is prevented from rotation, because the guide members 90a, 90b of the projection 86 are engaged with the walls of the slit 88. Accordingly, the rotary motion is converted by the feed nut 60 into the rectilinear motion. Thus, the displacement mechanism 38 is displaced in the direction of the arrow A.

Figure 5:
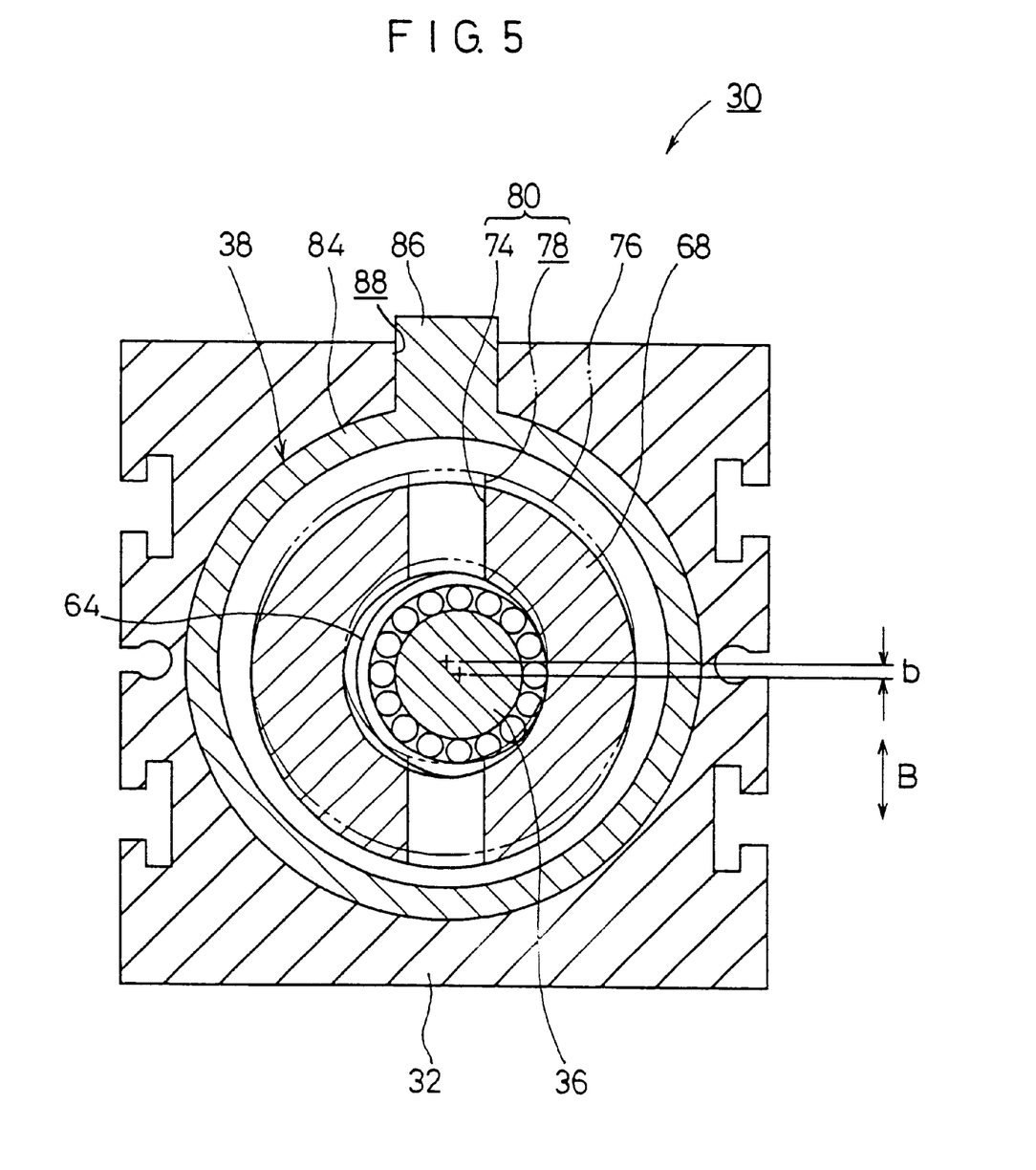
FIG. 5 shows a sectional view taken along a line V—V illustrating the actuator shown in FIG. 1.
Figure 6:
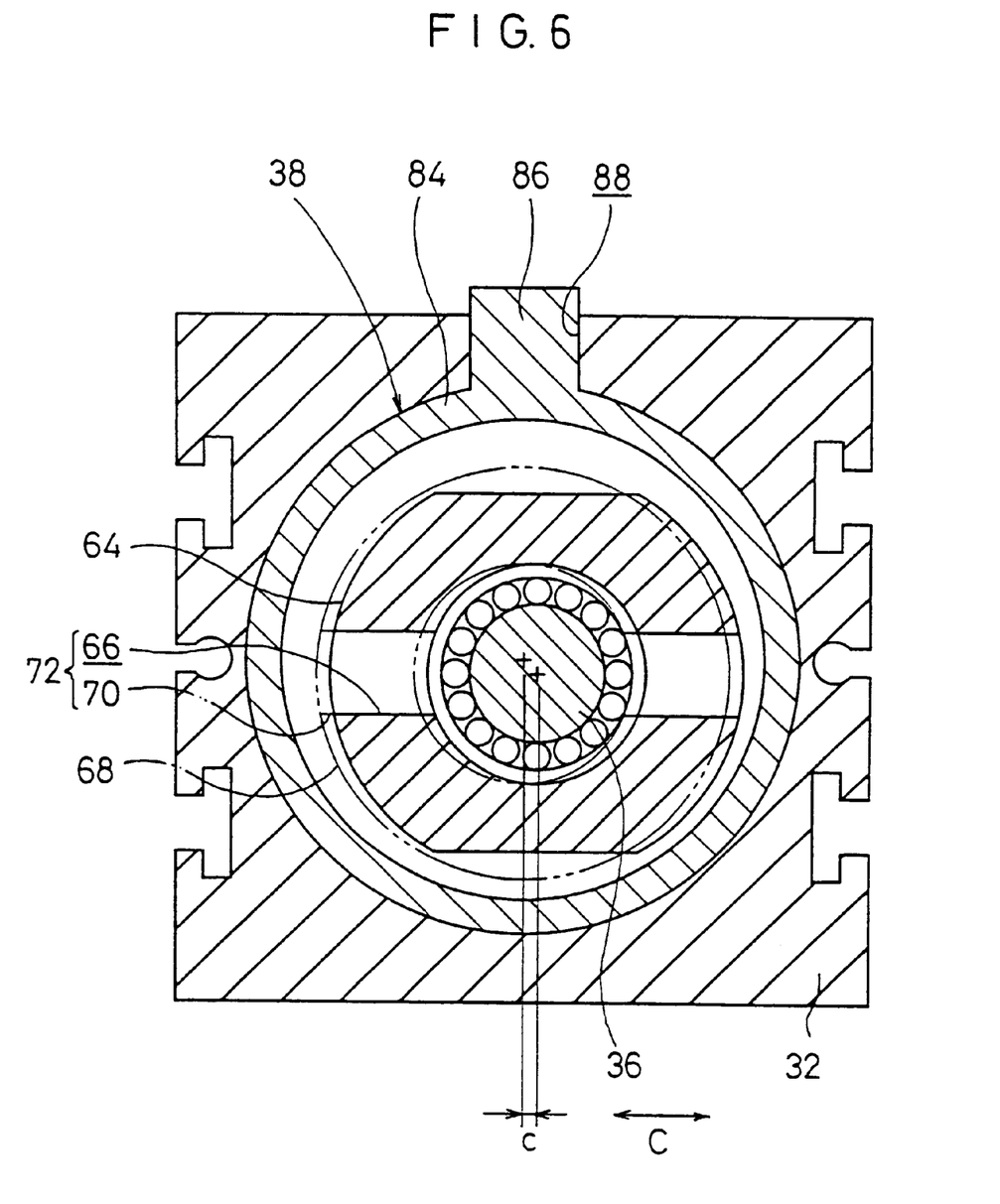
FIG. 6 shows a sectional view taken along a line VI—VI illustrating the actuator shown in FIG. 1.

Next, explanation will be made for a case in which the ball screw 36 suffers from axial deviation with respect to the frame 32 as shown in FIGS. 5 and 6.

When the ball screw 36 involves axial deviation in an amount of b in the direction of the arrow B with respect to the frame 32, as shown in FIG. 5, the second guide section 74 of the engagement member 68 is displaced by the amount of b with respect to the second guide groove 78 of the second sliding guide 76 which constitutes the second guide mechanism 80. When the ball screw 36 involves axial deviation in an amount of c in the direction of the arrow C with respect to the frame 32, as shown in FIG. 6, the first guide section 70 of the engagement member 68 is displaced in the amount of c with respect to the first guide groove 66 of the nut holder 64 which constitutes the first guide mechanism 72. On the other hand, the first sliding guide 54 and the second sliding guide 76 are not displaced in the directions of the arrows B, C with respect to the frame 32. Therefore, when the ball screw 36 is rotated in a state of involving axial deviation with respect to the frame 32, the nut holder 64 is displaced in the depth direction in FIGS. 5 and 6. However, there is no increase in sliding resistance between the diametrally expanded sections 56, 82 of the first sliding guide 54 and the second sliding guide 76 and the inner wall of the frame 32. Thus, there is no fear of obstructing the displacement action of the displacement mechanism 38 (see FIG. 2).

Accordingly, when the actuator 30 is assembled, it is sufficient that the both ends of the ball screw 36 are subjected to centering adjustment with respect to the shaft support members 50a, 50b. It is unnecessary to provide any step for performing strict centering adjustment for the ball screw 36 and the feed nut 60 with respect to the frame 32. Therefore, the assembling operation for the actuator 30 is simplified, and the operation efficiency is improved.

The displacement mechanism 38 is capable of making appropriate displacement when the actuator 30 has a lengthy size with the ball screw 36 formed to be long, and the ball screw 36 is warped due to its own weight, or even when the ball screw 36 is warped by a load of a workpiece or the like exerted on the displacement mechanism 38. Therefore, it is possible to obtain the actuator 30 having a long displacement range. It is possible to increase the load of the workpiece which can be transported by the actuator 30.

Figure 7:
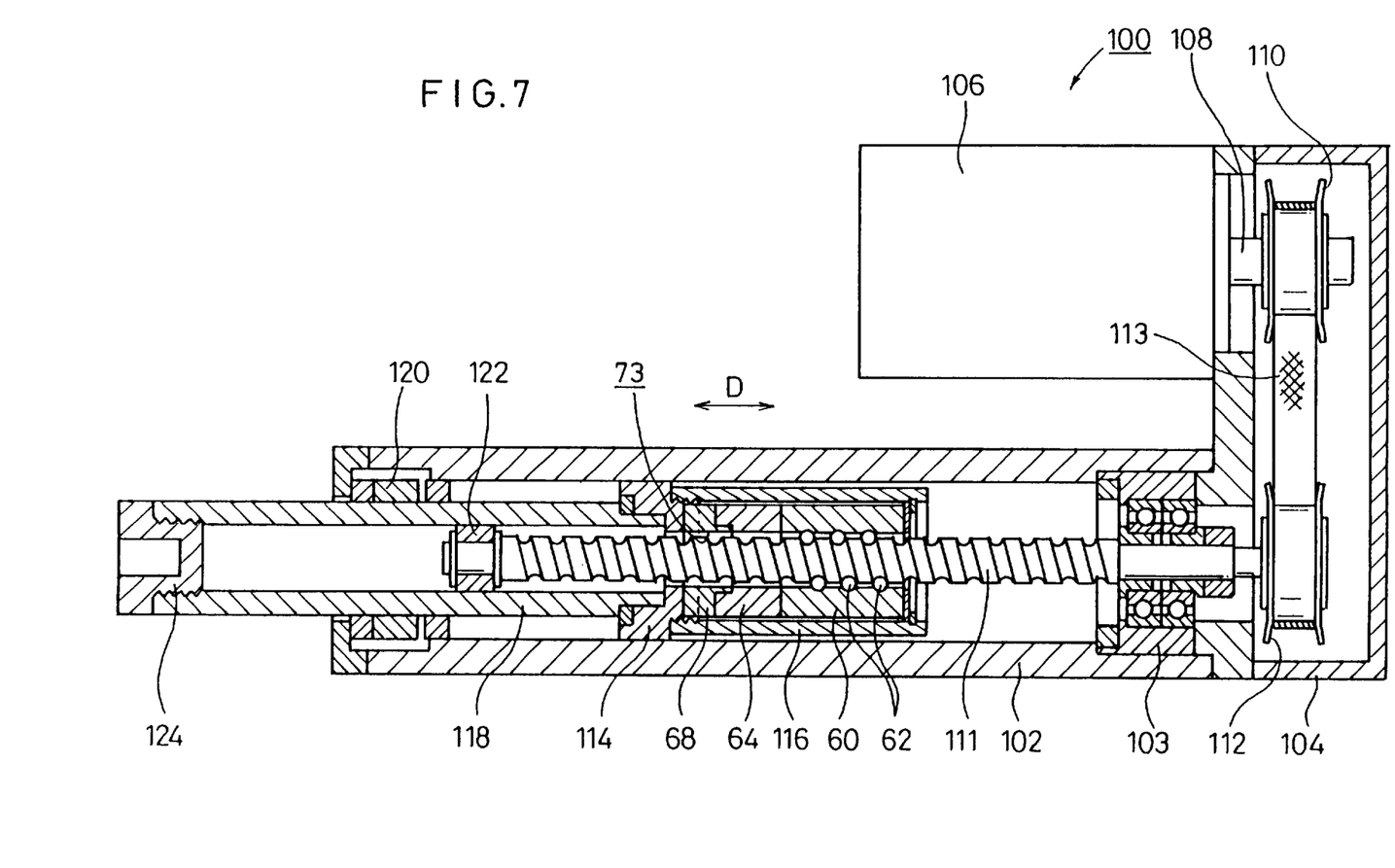
FIG. 7 shows a longitudinal sectional view illustrating an actuator according to a second embodiment of the present invention.

Next, an actuator 100 according to a second embodiment will be explained with reference to FIG. 7. The same components or parts as those described in the first embodiment are designated by the same reference numerals, detailed explanation of which will be omitted.

A casing 104 is secured to one end of a frame 102 of the actuator 100. The casing 104 is provided with a motor 106 which is disposed in parallel to the frame 102. A pulley 110 is provided on a rotary shaft 108 of the motor 106. On the other hand, a pulley 112 is provided at one end of a ball screw 111 which is rotatably supported by a shaft support member 103 of the frame 102. A belt 113 is wound around the pulleys 110, 112.

The feed nut 60 is engaged via the ball members 62 with the ball screw 111 in the same manner as in the actuator 30 according to the first embodiment. The nut holder 64 is secured to the feed nut 60. As shown in FIG. 4, the first guide section 70 of the engagement member 68 is slidably engaged with the first guide groove 66 of the nut holder 64. The second guide section 74 of the engagement member 68 is slidably engaged with the second guide groove 78 formed on a sliding guide 114.

A cylindrical displacement member 116, which surrounds the feed nut 60, the nut holder 64, and the engagement member 68, is provided at one end of the sliding guide 114. One end of a cylindrical member 118 is secured to the other end of the sliding guide 114. The other end of the cylindrical member 118 protrudes through the end of the frame 102, and it is slidably supported on the frame 102 by a support member 120. The end of the ball screw 111 is rotatably supported by a shaft support member 122 in the cylindrical member 118. The cylindrical member 118 is closed by a cover member 124. Accordingly, the actuator 100 is prevented from dust or the like which would be otherwise cause invasion from the outside of the actuator 100 into the inside of the frame 102. The actuator 100 is completely free from the fear of adhesion of dust or the like to the ball screw 111.

The actuator 100 according to the second embodiment is constructed as described above. Next, its operation will be explained.

When the motor 106 is operated, the pulley 110 is rotated via the rotary shaft 108. The rotary motion is transmitted to the ball screw 111 by the aid of the belt 113 and the pulley 112. The rotary motion of the ball screw 111 is converted by the feed nut 60 into the rectilinear motion, and the sliding guide 114 is displaced in the direction of the arrow D. Accordingly, the cylindrical member 118 is displaced in directions to make forward and backward movement with respect to the frame 102.

When the ball screw 111 involves axial deviation with respect to the frame 102, the following action is made in the same manner as in the actuator 30 according to the first embodiment. That is, the second guide section 74 makes sliding movement with respect to the second guide groove 78, and thus the engagement member 68 is displaced with respect to the sliding guide 114. Further, the first guide section 70 makes sliding movement on the first guide groove 66, and thus the nut holder 64 is displaced with respect to the engagement member 68 (see FIG. 4). Accordingly, even when the ball screw 111 is rotated in a state of axial deviation with respect to the frame 102, the sliding resistance is not increased between the sliding guide 114 and the inner wall of the frame 102. Thus, there is no fear of obstructing the displacement action of the cylindrical member 118 (see FIG. 7).

Therefore, when the actuator 100 is assembled, it is sufficient that the both ends of the ball screw 111 are subjected to centering adjustment with respect to the support member 120, the shaft support member 122, and the shaft support member 103. It is unnecessary to provide any step for performing strict centering adjustment for the ball screw 111 and the feed nut 60 with respect to the frame 102. Therefore, the assembling operation for the actuator 100 is simplified, and the operation efficiency is improved.

The cylindrical member 118 is capable of making appropriate displacement when the ball screw 111 is warped by its own load, or even when the ball screw 111 is warped by a load exerted on the cylindrical member 118. Accordingly, it is possible to obtain the actuator 100 having a long displacement range. It is possible to increase the load of the workpiece.

As described above, in the actuators 30, 100 according to the first and second embodiments, the ball screws 36, 111 have been used as the feed screw. However, it is also preferable to use a slide screw.

A flexible member such as those made of rubber may be used in place of the engagement member 68 to connect the nut holder 64 to the second sliding guide 76 or the sliding guide 114 so that the axial eccentricity-absorbing mechanism 58 is constructed.

What is claimed is:

1. An actuator comprising:
   a feed screw configured to rotate by a rotary driving source;
   a feed nut engaging with said feed screw and configured to convert rotary motion of said feed screw into rectilinear motion;
   a frame having a substantially cylindrical hollow space and accommodating said feed screw and said feed nut therein;
   a displacement member configured to move along said substantially cylindrical hollow space in the frame in accordance with a displacement action of said feed nut;
   a substantially cylindrical sliding guide accommodated in said substantially cylindrical hollow space in the frame and connected to said displacement member, said substantially cylindrical sliding guide having a side wall slidably in contact with an inner wall surface defining the substantially cylindrical hollow space in said substantially cylindrical hollow space in the frame in accordance with the displacement action of said feed nut; and
   an axial eccentricity-absorbing mechanism engaging with said displacement member and said feed nut such that said feed nut is capable of displacement in a direction perpendicular to a displacement direction of said displacement member, said axial eccentricity-absorbing mechanism including an engagement member configured to connect said feed nut and said displacement member, said engagement member having first and second guide mechanisms each having a hole therein through which said feed screw passes and a longitudinal axis which is linearly displaceable in a direction perpendicular to said displacement direction of said displacement member;
   wherein when the feed screw axially deviates with respect to said substantially cylindrical hollow space in the frame, said feed nut is displaced through said axial eccentricity-absorbing mechanism and sliding resistance between said substantially cylindrical sliding guide and said inner wall of the substantially cylindrical hollow space in the frame does not increase.

2. The actuator according to claim 1, wherein said eccentricity-absorbing mechanism comprises:

an engagement member for connecting said feed nut and said displacement member;

first guide mechanism is disposed at a connecting portion between said feed nut and said engagement member; and said second guide mechanism is linearly displaceable in a direction different from the displacement direction of said first guide mechanism and disposed at a connecting portion between said engagement member and said displacement member.

3. The actuator according to claim 2, wherein each of said first guide mechanism and said second guide mechanism comprises a guide section which is formed to have a linear configuration, and a guide groove which is slidably engaged with said guide section.

4. The actuator according to claim 2, wherein said second guide mechanism is capable of linear displacement in a direction perpendicular to said displacement direction of said first guide mechanism.

5. The actuator according to claim 2, wherein said engagement member is formed with a hole into which said feed screw is inserted, and a wall for constructing said hole is separated from said feed screw by a predetermined spacing distance.

6. The actuator according to claim 1, wherein said displacement member is formed with a projection which protrudes through a slit formed through said frame, and displacement motion of said displacement member is transmitted to the outside of said frame via said projection.

7. The actuator according to claim 1, wherein a cylindrical member, which is arranged in said frame to surround said feed screw, has its one end secured to said displacement member, and said cylindrical member is displaceable in directions to make forward and backward movement with respect to said frame.

8. The actuator according to claim 1, wherein said rotary driving source is arranged coaxially with said feed screw, and rotary motion of said rotary driving source is transmitted to said feed screw via a coupling.

9. The actuator according to claim 1, wherein said rotary driving source is arranged in parallel to said feed screw, and rotary driving force of said rotary driving source is transmitted to said feed screw via a rotary driving force-transmitting means.

* * * * *

UNITED STATES PATENT AND TRADEMARK OFFICE
CERTIFICATE OF CORRECTION

PATENT NO. : 6,327,924 B1  
DATED : December 11, 2001  
INVENTOR(S) : Nagai et al.

Page 1 of 1

It is certified that error appears in the above-identified patent and that said Letters Patent is hereby corrected as shown below:

Title page,
Item [45], and the Notice information should read:
-- [45]  Date of Patent:      *Dec. 11, 2001 --

-- (*) Notice: This patent issued on a continued prosecution application filed under 37 CFR 1.53(d), and is subject to the twenty year patent term provisions of 35 U.S.C. 154 (a)(2).
Subject to any disclaimer, the term of this patent is extended or adjusted under 35 U.S.C. 154(b) 0 days. --

Signed and Sealed this

Thirtieth Day of April, 2002

Attest:

Attesting Officer

JAMES E. ROGAN
Director of the United States Patent and Trademark Office